United States Patent [19]
Moore

[11] Patent Number: 6,093,376
[45] Date of Patent: Jul. 25, 2000

[54] SELECTIVE SEPARATION OF RARE EARTH ELEMENTS BY ION EXCHANGE IN AN IMINODIACETIC RESIN

[76] Inventor: Bruce W. Moore, 2244 Ralston Rd., Sacramento, Calif. 95821

[21] Appl. No.: 09/061,660

[22] Filed: Apr. 17, 1998

Related U.S. Application Data

[63] Continuation-in-part of application No. 08/686,263, Jul. 25, 1996, abandoned.

[51] Int. Cl.$^7$ .................................................. C01F 17/00
[52] U.S. Cl. ............................................................ 423/21.5
[58] Field of Search .......................................... 423/21.5

[56] References Cited

U.S. PATENT DOCUMENTS 4,394,353  7/1983  Miyake et al. ......................... 423/21.5

FOREIGN PATENT DOCUMENTS

| | | | |
|---|---|---|---|
| 49-97722 | 9/1974 | Japan .................................... | 423/21.5 |
| 2-179835 | 7/1990 | Japan .................................... | 423/21.5 |
| 2139915 | 11/1984 | United Kingdom .................. | 423/21.5 |

*Primary Examiner*—Steven Bos

*Attorney, Agent, or Firm*—K. S. Cornaby

[57] ABSTRACT

A method is disclosed to separate the heavy rare earth elements Lu through Sm plus Y by an ion-exchange process called selective elution. Mixed rare earths are saturated onto a loading column containing sulfonic resin. Iminodiacetic resin in a separation column is conditioned into the hydrogen and ammonium form before it is saturated with rare earth retaining ion. The rare-earth retaining ion has an atomic weight at least as heavy as the heaviest rare earth element being separated. The hydrogen form section is positioned down stream of the ammonium form resin. Chelating solutions like ammonium EDTA are put through the loading and then the separation column to separate the rare earth elements. The hydrogen form iminodiacetic resin is very selective for separating rare earth elements. By using an ammonium EDTA solution with pH 8.2 to 8.6, the iminodiacetic resin in separation column is returned to the proper ratio of ammonium and hydrogen form resin. The process uses a solution velocity of 1–10 cm/min through the columns. The separation column contains about half as many moles of retaining ion as the loading column contains mixed rare earth. EDTA solution containing impure rare earth from previous runs is recycled and increases rare earth recovery. These aspects singularly and in combination are an improvement over prior art.

9 Claims, 4 Drawing Sheets

SELECTIVE SEPARATION OF RARE EARTH ELEMENTS BY ION EXCHANGE IN AN IMINODIACETIC RESIN

This is a continuation-in-part of U.S. patent application Ser. No. 08/686,263, filed Jul. 25, 1996, now abandoned.

BACKGROUND OF THE INVENTION (1) Field of the Invention

The rare earth elements (REEs) are the Lanthanum series elements plus Yttrium, Atomic Number elements 57 through 71 plus 39. This invention provides a method for separating the 10 heaviest lanthanum series elements Sm through Lu plus Y.

This ion exchange project was initiated to find a method other than solvent extraction for separating the heavy rare earth elements. Solvent extraction is the current method used to separate the rare earths, but is best suited to separating the high tonnage light rare earths, cerium subgroup La through Sm plus Eu. The most abundant rare earth, cerium, is precipitated as $Ce^{+4}$ when the other rare earths are digested and put into solution in the "+3" oxidation state. Europium is difficult to separate from the other rare earths by solvent extraction, but its high value makes its recovery commercially attractive.

Solvent extraction requires a large capital investment for each REE recovered and requires significant time while the mixer-settlers obtain equilibrium. The heavy REEs, yttrium subgroup Eu through Lu plus Y are more difficult to separate by solvent extraction, and the economy of scale is less favorable.

It was postulated that an improved ion exchange process would be more economical, technically favorable, and environmentally friendly. At the end of World War II, an ion exchange technique called band displacement or displacement chromatography was discovered to separate the rare earths. This process was the first method that produced pure REEs on a commercial scale, but it required many months to produce a product.

(2) Description of Prior Art

The REEs have very similar chemical and physical properties. A number of methods have been used to separate them.

Fractional precipitation takes advantage of differences in the solubility product of the REEs. Carbonate, oxalate, and hydroxide anions precipitate rare earths as ammonium double salts. This method requires many recrystallizations and does not produce a pure product. The heavy rare earths are more difficult to separate than the light rare earths. This method has been abandoned for most rare earth separations.

Solvent extraction is a well known technique of separation. The REEs have a preferential distribution between two immiscible liquid phases. Extractants useful for separating rare earths are: neutral phosphorous agents; monoacidic orthophophosphate and phosphorate esters; and primary, secondary, tertiary, and quatery amine species. An acidic aqueous phase is used in combination with the extractant. After many mixer-settlers contracts, a rare earth can be separated from the other rare earths. High purity requires an extremely high number of mixer settlers. A different plant is required for each REE. The elements in the yttrium subgroup are more difficult to separate than those in the cerium subgroup. Dedicating a solvent extraction plant to each of the heavy REE is difficult to justify on an economic basis because of their low abundance. If Y is excluded from the heavy rare earths, then the combined weight of the five REEs in the cerium subgroup in the earth's crust is five times greater than the combined weight of the nine heavy REEs. Solvent extraction reagents must be replaced when degraded. Environmental laws requires the destruction of organic reagents.

An ion exchange technique called elution chromatography can be used to separate REEs. By this analytical method, mixed rare earths are pumped into an ion exchange column and then an eluent is pumped into the ion exchange column to push the rare earths through the column. Separation is accomplished by each of the REEs traveling through the resin column at different rates. The rare earths are collected as they exit the column. Sulfonic resin and alpha-hydroxyisobutyrate eluent are typically used. In this process, only a small fraction of the resin is occupied by rare earths while the separation is occurring. This process separates a small amount of the rare earth for the amount of capital and skilled labor invested.

Rare earths can also be separated by an ion exchange technique called "displacement chromatography," or referred to as "band displacement". Columns containing ion exchange resin are connected head-to-tail. A length of resin is used to contain the mixed REEs being separated; this is called the "loading column". The term "band of mixed rare earth" refers to the amount of rare earth being separated. The rare earths are saturated on the loading column's resin and are measured as a volume or length if all the columns have the same diameter. The preferred exchange media is sulfonated polystyrene-divinylbenzene copolymer resin (sulfonic resin), which is a strong cation exchange resin. A band of mixed rare earths is saturated on the sulfonic resin in one or more columns (i.e. loading column) from a rare earth salt solution of chloride, sulfate, or nitrate.

Sulfonic resin in a second group of columns called "separation column" is converted to a special cation state by pumping a sulfate, chloride, or nitrate solution of that cation through the resin. The special cation is $Cu^{+2}$ or $Zn^{+2}$ if ethylenediaminetetraacetic acid (EDTA) is used, or $H^+$ if hydroxyethylenediaminetriacetic acid (HEDTA) is used. Ammonium EDTA or HEDTA is pumped through the loading column containing the mixed REEs and then through the separation column saturated with the special cation. Ammonium chelating solutions of EDTA and HEDTA are used to strip or elute the REEs. The ammonium associated with the chelating solutions replaces the REE on the loading columns resin. The chelates have a tighter affinity for heavier REEs than lighter REEs. The special cation on the resin acts as a chemical barrier or retaining ion by exchanging places with the REE in solution. This prevents the faster eluting heavy REEs from traveling through the columns at the speed of the EDTA. The lighter rare earth cations in solution exchange places with heavier rare earths saturated on the resin and this promotes the development of purified bands of rare earth elements. Many of the rare earths have distinctive colors that emphasize this chromatic effect.

The number of exchange sites required in the separation column is usually two or three rare earth band lengths of resin for exchange columns with the same diameter. Other mass transfer parameters include eluent velocity, temperature, resin diameter and porosity, which REEs are being separated, etc. A quantity of impure (binary) rare earth occupies the resin between each pure REE in the separation column. What percentage of a given REE is pure depends on mass transfer factors, diameter of column, and amount of that REE being separated. The rare earth solution containing binary REEs is decomposed and the rare earth is recycled to a subsequent band displacement. Eluent containing one REE is precipitated as an oxalate and then burned to produce rare-earth oxide product.

Band displacement requires low elution velocities of about 1 cm/min or lower, to facilitate the mass transfer required for good separation. Higher initial velocities are frequently used to make rough separations, but additional elutions at lower velocities are then required. Odd atomic numbered REEs are scarcer than even atomic numbered REEs. Also, heavier REEs are scarcer than lighter REEs. The absolute length of resin between separated REEs is the same for different diameter columns. For this reason, scarce rare earths are eluted onto small diameter columns to increase rare earth recovery. Smaller diameter columns with the same eluent velocity require longer elution times.

The number of mixed rare-earth band lengths of retaining cations required to obtain a given separation depends on mass transfer parameters. The time required to complete an industrial scale rare-earth separation is about five months. When EDTA is used, it is very difficult to separate and recycle the Cu and EDTA because they are bound very tightly together. Also, Lu bleeds through the retaining ion. If Zn is used as retaining ion, the EDTA and Zn can be separated and recycled, but Lu, Yb, Tm, and Er will bleed through the Zn. HEDTA is easily recycled, but it does not separate the medium weight REEs Sm through Ho.

Resins other than sulfonic were tested as a media to separate REEs. Iminodiacetic resin was tested, but with little success. A gross separation of the heavy/light REEs was reported as the best results achieved. Hydrogen form iminodiacetic resin was used to concentrate Sc from other elements using dilute acids like HCl, and then a chelating eluent was used to clute the Sc.

Of the methods cited, only band displacement shares the same separation scheme as selective elution. This invention describes in detail the differences between band displacement and selective elution. The other methods of separating the rare earth elements are based on different technologies.

SUMMARY OF THE INVENTION

Selective elution has a different separation mechanism than band displacement. Selective elution uses more than one type of resin and a different retaining ion. In selective elution, the loading column contains sulfonic resin which are used to adsorb the mixed rare-earth band. The separation column contains Iminodiacetic resin in the ammonium form and hydrogen form. The retaining ion is one or more REEs as heavy or heavier than any REE being separated. The iminodiacetic resin is said to be in the "ammonium form" or "hydrogen form" if the resin is loaded with these ions prior to being saturated with retaining ion. After the elution of rare earths with 5–9 pH ammonium EDTA, the upstream end of the iminodiacetic resin column is in ammonium form and the downstream end of the iminodiacetic resin column is in hydrogen form. An ammonium EDTA pH of 8.2 to 8.6 is preferred because it will condition the iminodiacetic resin into the proper volume ratio of "ammonium" and "hydrogen form" resin. The chemical structure of iminodiacetic resin is very similar to EDTA, but the sequence of chemical attraction to the REE is reversed. EDTA has a high affinity for heavy rare-earth elements and low affinity for light rare-earth elements. Iminodiacetic resin has a great affinity for light rare-earth elements and a small affinity for heavy rare-earth elements. The high affinity that iminodiacetic resin has for the light rare earth prevents EDTA from quantitatively stripping the light REEs Nd, Pr, Ce, and La from iminodiacetic resin. By contrast, sulfonic resin has only a slightly greater affinity for the light REEs than the heavy REEs. EDTA quantitatively strips the light rare earth from sulfonic resin. This difference in chemical affinity between iminodiacetic resin and EDTA for the heavy and light rare-earth elements gives selective elution two separation equilibriums and may account for the excellent segregation achieved by this resin-eluent combination. With the EDTA-sulfonic resin combination, only the EDTA has a significant difference in affinity for the various REE.

Rare earth has a different association with the EDTA anion complex during band displacement and selective elution. In selective elution, REE-EDTA complex adsorbs on the iminodiacetic resin. At the start of an elution, the EDTA concentration exiting the iminodiacetic resin is less than the EDTA entering, but at the end, it is in excess. REEE-DTA complex is captured at start of elution, and then is stripped as the last rare earth is eluted. Typically when 4 g/L EDTA is used, EDTA concentration climbs from 0 g/l initially to as high as 6 g/L as the rare earth elution ends. If ammonium EDTA is pumped through the iminodiacetic column after the REE has been eluted, EDTA concentration remains constant. EDTA concentration is essentially constant when it elutes through rare-earth-loaded sulfonic resin.

The sequence of attraction EDTA has for rare earth, ammonium, and hydrogen is different in band displacement and selective elution. In band displacement, the order of EDTA attraction to the cations is: hydrogen, strongest; rare earth, second; and ammonium least. Ammonium from $H_m(NH_4)_n$EDTA replaces rare earth on sulfonic resin on an electrical equivalence basis. Hydrogen associated with the EDTA passes through sulfonic resin without exchanging. As an example, a solution of ammonium EDTA at pH 8.0 contains about one hydrogen cation and three ammonium cations associated with each EDTA anion. EDTA elutes hydrogen, ammonium and rare earth as shown in the formula $(H)^+(NH_4,REE)^{+3}EDTA^{-4}$, where rare earth and ammonium cations in combination $(NH_4,REE)$ have a electrical equivalence of three. During band displacement, the majority of the $(NH_4,REE)^{+3}$ is REE at the start of the elution, but gradually changes to all $NH_4$ at the end, with the final exiting eluate having the formula $H(NH_4)_3EDTA$. The concentration of hydrogen and EDTA remains constant during the elution. If each eluent EDTA molecule had two hydrogen and two ammonium molecules (i.e. pH 6), then $(H)_2(REE,NH_4)^+{}_2EDTA$ would be transported through column and less REE would be carried by the EDTA. After all the rare earth is eluted, the exit and feed solution are identical. Band displacement separation is degraded when the EDTA pH is above 8.4. A larger fraction of the eluent will contain binary rare earth rather than single-element rare earth.

In selective elution, the order of EDTA attraction to the cations is: rare earth, strongest; hydrogen, second; and ammonium, least. An ammonium EDTA solution with pH between 5 and 9 can be used to elute rare earth from iminodiacidic resin. The eluent will have the formula $(H,NH_4)^{+1}(REE)^{+3}EDTA^{-4}$. Each EDTA molecule carries one REE cation, and a combination of $NH_4^+$ and $H^+$ cations having a total electrical equivalence of one. A consequence of this is that the rare earth concentration eluted is not dependent on $NH_4$ concentration, but on EDTA concentration. During rare earth elution, $NH_4$ displaces hydrogen from the top of the separation column and then hydrogen will displace rare earth from lower in the column. In this way, the top portion of iminodiacetic resin is converted to "$NH_4$ form", and the bottom portion is put in "hydrogen form" as rare earth is stripped. At pH 6, little $NH_4$ is adsorbed on the iminodiacetic resin. A pH 8.2 to 8.6 is required to return the separation column to its initial ratio of "ammonium" and "hydrogen form" resin.

Iminodiacetic resin has a variable loading capacity for transitional metals and rare earths, depending on its previous cation form. Strong bases like NaOH, $Ca(OH)_2$, and $NH_4OH$ give iminodiacetic resin a high capacity, while acids like HCl, and $H_2SO_4$ give it a low capacity. Buffered compounds like $NaH_2PO_4$ and $H(NH_4)_3EDTA$ give iminodiacetic resin an intermediate loading capacity. Each iminodiacetic resin molecule can have between 0 and 3 hydrogen ions associated with it, depending on how it was conditioned. If the iminodiacetic resin is conditioned with $H^+$, then few sites are available to adsorb rare earths.

When designing a selective elution process, the ratio of $NH_4^+$ and $H^+$ form resin in the separation column sections are sized for the concentration of different REE in the feed. The relative concentration of REEs is important. Rare earth feeds containing a higher ratio of heavier REE require more "hydrogen form" iminodiacetic resin. Feed solutions with low concentration of early eluting REEs will require less "hydrogen from" resin. Depending on the loading column's mixed band length, the separation column should contain about half as many exchange sites. The ammonium form resin performs a gross separation of the rare earths and provides exchange sites to hold any lighter REE that coelute with the heaviest REE from the sulfonic resin. The "hydrogen form" iminodiacetic resin finishes the separation. "Hydrogen form" resin is much more selective in separating the different REE than is the "ammonium form" iminodiacetic resin or sulfonic resin. The "ammonium form" resin economize the length of the "hydrogen form" resin required for the selective elution. Ammonium form" resin has about 10 times the number of exchange sites as "hydrogen form" resin on a volume basis.

EDTA solution is assayed for REE concentration as it exits the separation column. Rare earth of sufficient purity (i.e. "pure") is pumped into a tank for that REE. Each pure REE is stored in a tank dedicated to that REE. Eluent containing rare earth of insufficient purity is stored in a tank for that pair of REEs and is called a "binary" rare earth solution. Pure REE solution are process as described below to recover pure rare earth oxide and recycle the EDTA. Binary REE solutions are saved and recycled during a subsequence selective elution.

The progression of REEs in the "mixed band" entering the separation column can be calculated or measured. Binary solutions saved from previous elutions are recycled into the top of the separation column. This is done when half of the lighter REE in the binary on the loading column has eluted. The flow of ammonium EDTA to the loading column is interrupted when binary REE solution is recycled. Recycling binary REE increases the amount of rare earth processed and percentage of pure rare earth recovered. Scarce REEs can be accumulated for several selective elutions as a binary, and then process when enough is available.

In a preferred embodiment, the following steps are followed:

preparing an ion exchange separation column containing an iminodiacetic resin;

conditioning said iminodiacetic resin by contacting a first portion of the iminodiacetic resin with an acid to place the first portion in a hydrogen form;

contacting a second portion of the iminodiacetic resin with an intermediate buffer to place the second portion in an ammonium form;

saturating both said first and second portions of the iminodiacetic resin with a rare earth element-retaining ion at least as heavy as the heaviest rare earth element being separated;

arranging the sequence of the first and second portions in the separation column so that the first portion is downstream of the second portion; and eluting rare earth elements with chelating agent in the separation column.

As an alternative, the acid used to place the first portion of the iminodiacetic resin in a hydrogen form is a mineral acid.

As a second alternative, the intermediate buffer used to place the second portion of the iminodiacetic resin in an ammonium form is $(NH_4)HPO_4$.

DETAILED DESCRIPTION OF THE INVENTION

Figure 1:
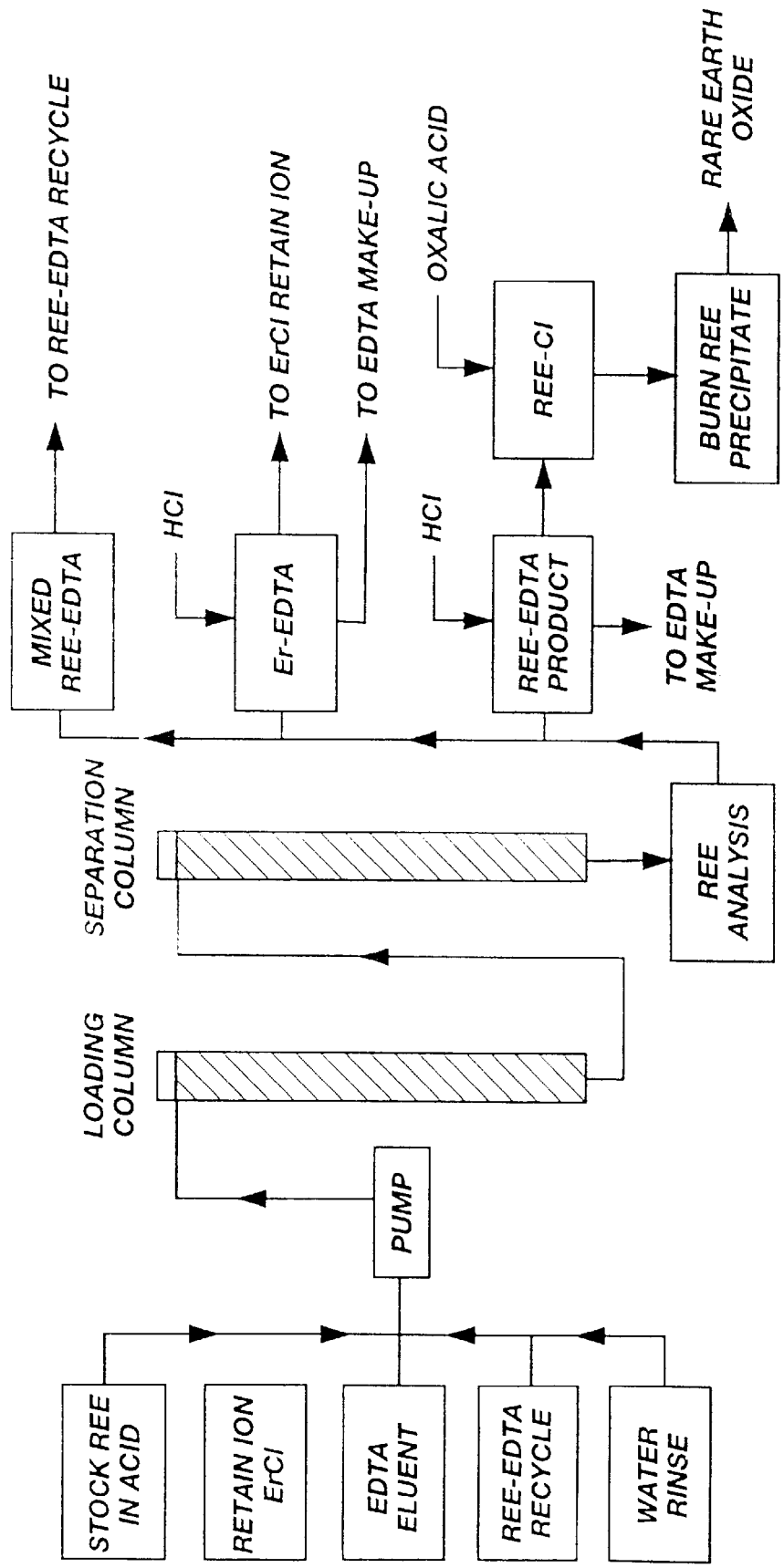
FIG. 1 illustrates a schematic flow diagram of selective elution and product processing

FIG. 1 details a flow sheet that identifies the steps in the batch operation of selective elution. The heavy rare-earth feed solution could come from a solvent-extraction process. Solvent extraction is well suited to separating the abundant light rare earths, but not the less abundant heavy rare earths. (1)Rare earth salt solutions containing feed and retaining ion (see 12 below) are pumped through the loading and separation columns, respectively. (2)The columns are then rinsed with water to remove salt. (3)The loading columns and separation columns are connected in series and then ammonium EDTA eluent is pumped through the columns. EDTA collected in step 8 is mixed with ammonium hydroxide and provides the majority of the EDTA required. (4)EDTA containing binary REE from a previous elution (14) is pumped into the head of the separation column as described in text; the ammonium EDTA flow is interrupted while this is done. (5)Ammonium EDTA flow is resumed after each binary REE-EDTA solution is recycled. (6)Rare earth eluting from the separation column is assayed. (7) Solution containing only pure REE is collected in a tank for that REE. (8)The pH of these solutions is adjusted to about 1.0 by HCl addition to precipitate the EDTA. The REE chloride solution is decanted. (9)Oxalic acid addition to the rare-earth chloride solution precipitates the rare earth. (10) NaOH solution leaches the oxalate precipitate. The oxalate is recovered and then recycled in step 9. (11)The REE hydroxide is calcined to form the rare earth oxide. (12)The retaining ion typically constitutes a portion of the mixed rare earth and some of the recovered retaining ion is precipitated and recovered as product. The majority of the retaining ion is recycled (1). (13)The EDTA eluent containing different combinations of two rare earths (referred to as binary REEs), is saved in tanks reserved for those two elements and the solution is recycled (4).

FIGS. 2 and 3 compare the separation of REE using band displacement (i.e., part A) and selective elution (i.e., part B).

In both processes, air in the EDTA solution was degassed. The ion exchange columns were heated to 60° C., and 4 g/l EDTA (adjusted with ammonium to pH 8) was pumped through the 2.2 cm ID columns at 3.9 ml/min. This corresponds to an eluent linear velocity of 1 cm/min. A sulfonic resin column saturated with 64 mmoles of mixed rare earth was used in each of the tests.

Figure 2A:
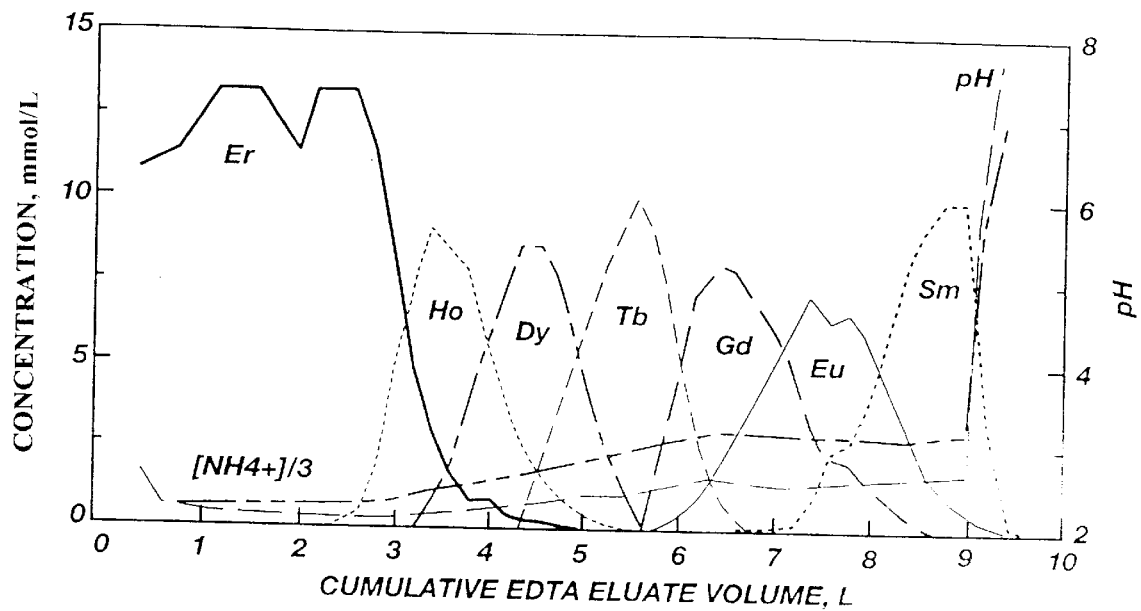
FIG. 2 illustrates band displacement (i.e. A) and selective elution (i.e. B) using identical loading column containing REEs Ho through Sm and an Er retaining ion.
Figure 2B:
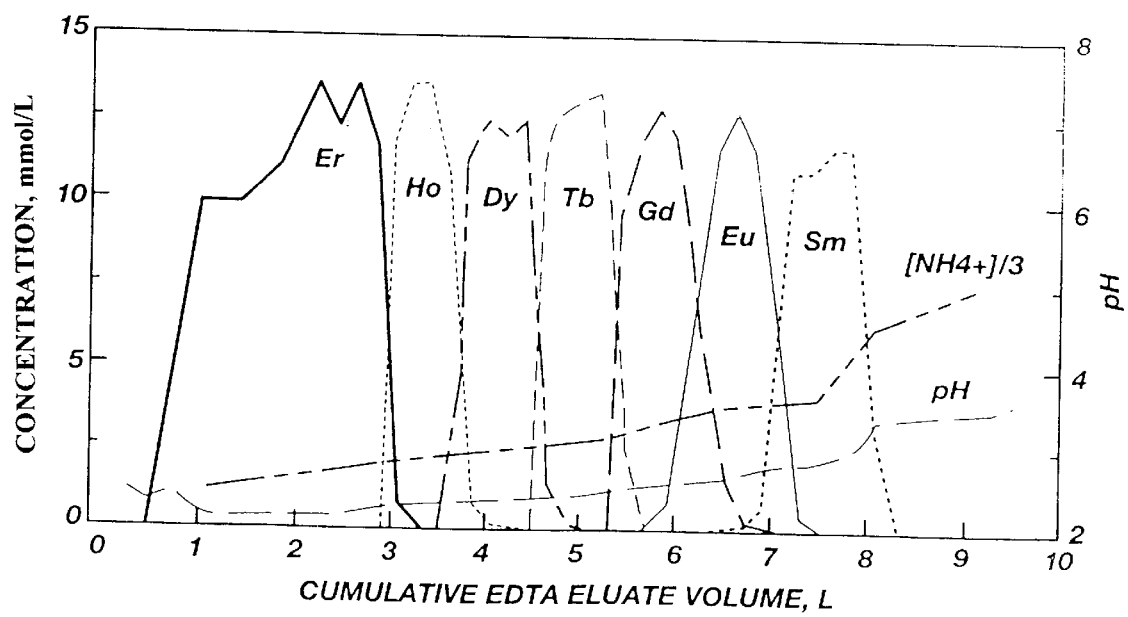

In FIGS. 2A and 2B, equal molar amounts of rare earths, Ho—Sm, were separated using an Er-retaining ion. For the band displacement shown in FIG. 2A, the sulfonic resin separation column was saturated with 46 mmoles of Er retaining ion. For the selective elution shown in FIG. 2B, the hydrogen form iminodiacetic separation column was saturated with 27 mmoles of Er retaining ion. The selective elution (i.e. FIG. 2B) isolated each REE into a smaller volume of solution than the band displacement (FIG. 2A). No more than two REEs were present in any of the EDTA from the selective elution, while the EDTA eluent from the band displacement contained several REEs. With selective elution, the separation columns contained 42% of a mixed-band length. The separation column for the band displacement contained 72% of a mixed-band length. In a full scale system, selective elution would require less than half a mixed band length, while band displacement would require more than one band length. The lines tracking the $NH_4^+/3$ mole concentration and pH on graph 2A shows that ammonium displaces REE on the resin and when all the REEs are eluted, the pH of the EDTA returns to its initial value. These lines on FIG. 2B show that the $NH_4^+$ is being adsorbed on the iminodiacetic resin after the EDTA has eluted all the REEs.

Figure 3A:
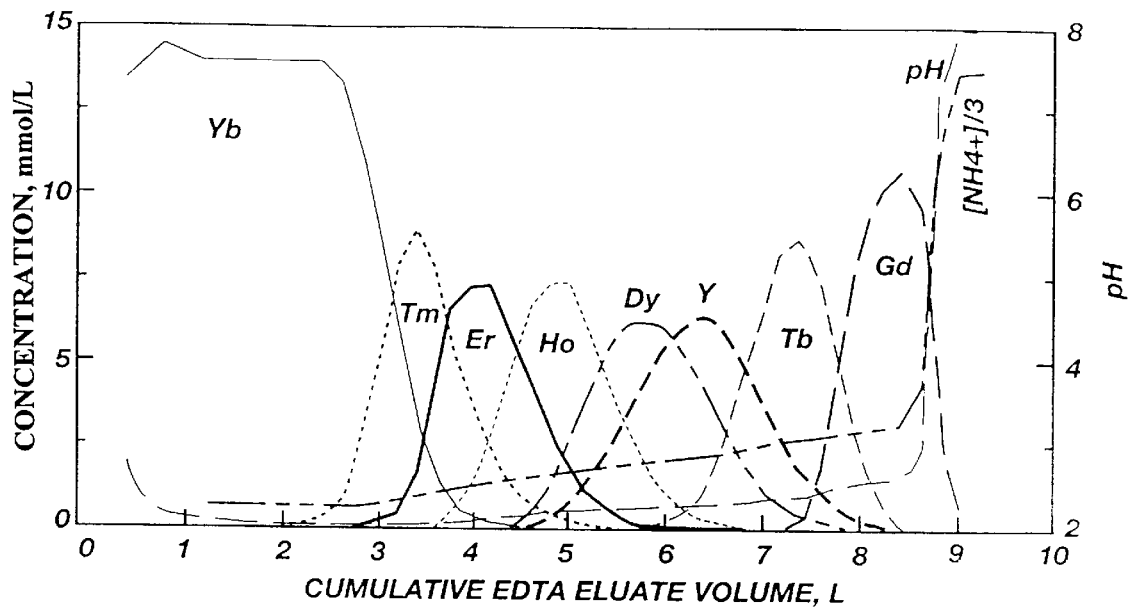
FIG. 3 illustrates band displacement (i.e. A) and selective elution (i.e. B) using identical loading column containing REEs Tm through Gd plus Y using a Yb retaining ion.
Figure 3B:
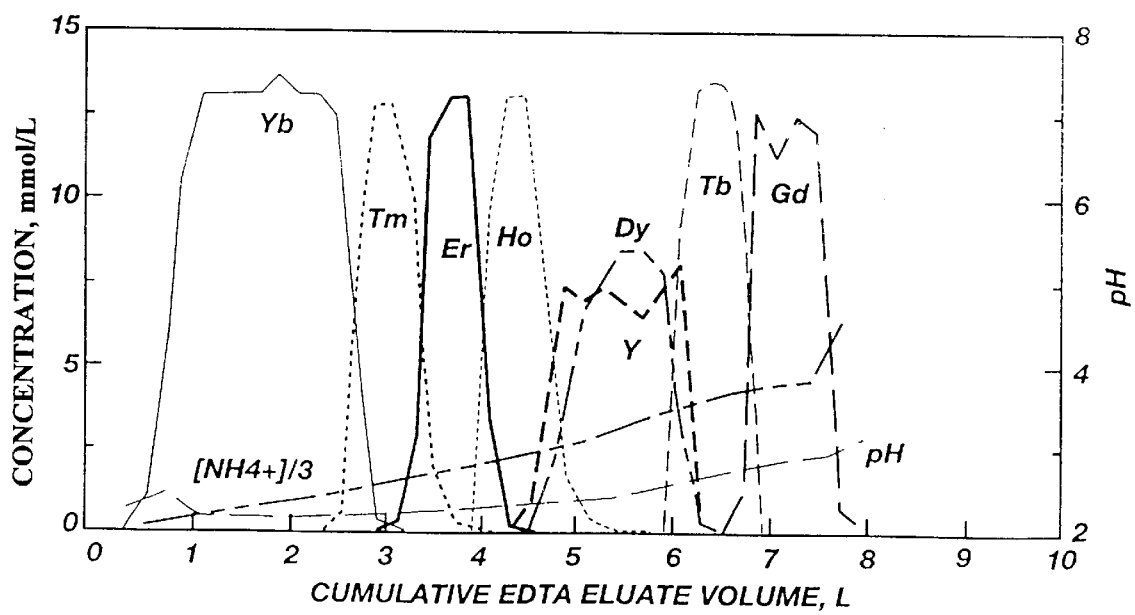

FIGS. 3A and 3B show the separation of equal molar amounts of rare-earth elements Tm—Gd plus Y. The displacement elution in FIG. 3A had 42 mmoles of Yb-retaining ion saturated on the sulfonic resin separation column. The selective elution in FIG. 3B used a hydrogen form iminodiacetic resin separation column saturated with 26 mmoles of Yb. The selective elution separation was more efficient and only used 62% as much retaining ion. The Y and Dy were eluted together in selective elution at 60° C. At 20° C., Y elutes between Dy and Ho. Note the selective elution used less EDTA solution.

Figure 4:
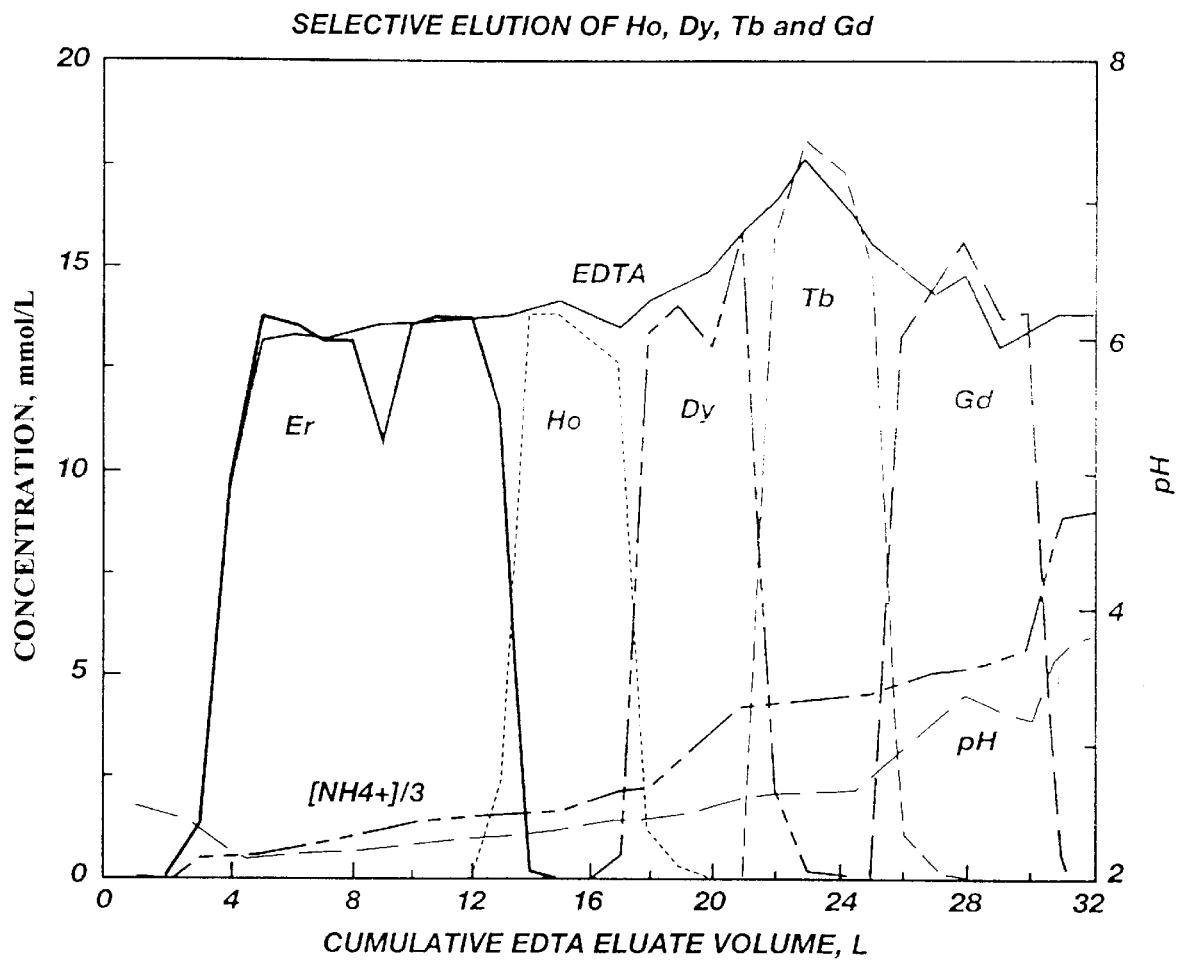
FIG. 4 shows the art of selective elution on a small scale with at a high EDTA eluent velocity of 5 cm/min.

FIG. 4 shows a selective elution of 64 mmols each of Ho, Dy, Tb, and Gd, with 124 mmols of Er retaining ion. The Er was loaded equally on hydrogen and ammonium form iminodiacetic resin; the length of the hydrogen form resin was about ten times the length of the ammonium form resin. The columns were 2.2 cm ID and contained 90 cm of resin. All together, one loading column and six separation columns were used. The column segments were heated with water jackets to 60° C. A 4 g/L EDTA (i.e. 13.8 mmols/L EDTA) solution had a pH 8.4 pumped through the columns at 19 ml/min(i.e. 5 cm/min). Over half of the mixed rare earth was separated to 99% purity or better. These are excellent results considering the short length of the system and eluent velocity.

Note that the plot of the EDTA concentration line in FIG. 4 corresponds closely to the total REE concentration, showing a 1:1 ratio of REE to EDTA during the elution. The molar concentration of $NH_4/3$ is about two-thirds the EDTA concentration after the rare earth has been eluted, or each EDTA has about two $NH_4$'s associated with it. FIGS. 2A and 3A show that $NH_4/3$ concentration returns to the elution concentration of the retaining ion in a band displacement elution. The pH of a displacement elution returns to its initial measurement of 8 after the REE have been eluted. For selective elution, the last pH is lower than it's head value after the REE have been eluted. These results are illustrative of the differences in the mechanism between selective elution and band displacement elution.

With the iminodiacetic resin-EDTA combination, the mixed REE-EDTA solution, retaining ion, and EDTA can be recycled relatively easily. EDTA solutions containing binary rare earths can be recycled into the separation column.

Selective elution will separate the ten heaviest rare-earth elements, Sm to Lu, with Y eluting near Dy. With temperature adjustment, Y can be separated from Dy. Many polyaminoacetic eluents can be used as chelating eluent, with EDTA the preferred eluent. EDTA concentrations between 2 and 6 g/L are satisfactory, with 4 g/L preferred. EDTA buffered in a pH range of 5 to 9 is possible, but pH 8.2 to 8.6 is preferred. Ammonium is the preferred buffering cation. Iminodiacetic and sulfonic resin are manufactured by a number of companies, with IRC-718 from Rohm Haas and AG50-12× from Bio Rad used in these studies. Resins of mesh sizes 10 to 200 can be used, with 10 to 50 preferred. Resins with cross-linkage of 4 to 20 are possible, with 12 the preferred cross-linkage to promote low pressure drop in the columns. Resin expands when its ion form changes and a cross-linkage of 12 is enough to limit expansion and have acceptable mass transfer. Eluent velocities of 0.1 to 10 cm/min through the columns are possible, with velocities of 3 to 5 cm/min preferred. The columns can be operated at temperatures between 20 and 95° C., with 60 to 80° C. being preferred. The aqueous feed solutions must be degassed to prevent gas bubbles from forming in the resin.

Calculations indicate that selective elution can achieve separation of all heavy REE for commercial scale operations with a elution 10 day production cycle. This is an improvement over the existing art.

I claim:

1. An ion exchange process for selectively eluting rare earth elements comprising, the steps of:

preparing an ion exchange separation column containing an iminodiacetic resin;

conditioning said iminodiacetic resin by contacting a first portion of the iminodiacetic resin with an acid to place the first portion in a hydrogen form;

contacting a second portion of the iminodiacetic resin with an intermediate buffer to place the second portion in an ammonium form;

saturating both said first and second portions of the iminodiacetic resin with a solution of rare-earth ions;

absorbing the rare earth ions in the separation column;

arranging the sequence of the first and second portions in the separation column so that the first portion is downstream of the second portion; and eluting the rare earth ions from the separation column with a chelating agent.

2. A process as set forth in claim 1, including the step of passing the solution of rare earth ions through a sulfonic resin column prior to the saturating step.

3. A process as set forth in claim 2, wherein the sulfonic resin is adjusted to a pH of 5–9 before separating the rare earth elements in a separation column.

4. A process as set forth in claim 1, wherein an ammonium EDTA having a pH in the range 8.2 to 8.6 is passed through the separation column to place the first and second portions of the iminodiacetic resin in respective hydrogen and ammonium form after all the rare earth elements have been eluted from the separation column.

5. A process as set forth in claim 4, wherein the amonium EDTA has a concentration of from 1 g/L to 6 g/L and a linear velocity of between 0.1 and 10 cm/min. at a temperature of between 15° C.–90° C.

6. A process as set forth in claim 1, wherein selected rare earth elements are recovered from an elution and recycled.

7. A process as set forth in claim 1, wherein an EDTA containing one rare earth element is mixed with a mineral acid to reduce its pH to between 1.5–0; precipitating the EDTA for recycling; adding oxalic acid to the precipitate to precipitate the rare earth; and washing the rare earth precipitate with NaOH solution to recover the oxalic acid.

8. A process as set forth in claim 1, wherein the acid used to place the first portion of the iminodiacetic resin in a hydrogen form is a mineral acid.

9. A process as set forth in claim 1, wherein the intermediate buffer used to place the second portion of the iminodiacetic resin in an ammonium form is $(NH_4)HPO_4$.

* * * * *